(12) United States Patent
Quader et al.

(10) Patent No.: US 11,853,908 B2
(45) Date of Patent: Dec. 26, 2023

(54) DATA-ANALYSIS-BASED, NOISY LABELED AND UNLABELED DATAPOINT DETECTION AND RECTIFICATION FOR MACHINE-LEARNING

(71) Applicant: INTERNATIONAL BUSINESS MACHINES CORPORATION, Armonk, NY (US)

(72) Inventors: Shaikh Shahriar Quader, Scarborough (CA); Mona Nashaat Ali Elmowafy, Edmonton (CA); Darrell Christopher Reimer, Tarrytown, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 897 days.

(21) Appl. No.: 15/930,900

(22) Filed: May 13, 2020

(65) Prior Publication Data
US 2021/0357776 A1 Nov. 18, 2021

(51) Int. Cl.
*G06N 5/04* (2023.01)
*G06N 20/20* (2019.01)
*G06N 7/01* (2023.01)

(52) U.S. Cl.
CPC ............... *G06N 5/04* (2013.01); *G06N 20/20* (2019.01); *G06N 7/01* (2023.01)

(58) Field of Classification Search
None
See application file for complete search history.

(56) References Cited

U.S. PATENT DOCUMENTS

| 2019/0019061 A1 | 1/2019 | Trenholm et al. |
| 2019/0354810 A1 | 11/2019 | Samel et al. |
| 2019/0370384 A1 | 12/2019 | Dalek et al. |

FOREIGN PATENT DOCUMENTS

CN 107292330 A 10/2017

OTHER PUBLICATIONS

Pan et al., Detecting Web Attacks With End-to-End Deep Learning, Journal of Internet Services and Applications (2019) 10:16, pp. 1-22 (Year: 2019).*

(Continued)

*Primary Examiner* — Wilbert L Starks
(74) *Attorney, Agent, or Firm* — Rakesh Roy, Esq.; Kevin P. Radigan, Esq.; HESLIN ROTHENBERG FARLEY & MESITI P.C.

(57) ABSTRACT

Noisy labeled and unlabeled datapoint detection and rectification in a training dataset for machine-learning is facilitated by a processor(s) obtaining a training dataset for use in training a machine-learning model. The processor(s) applies ensemble machine-learning and a generative model to the training dataset to detect noisy labeled datapoints in the training dataset, and create a clean dataset with preliminary labels added for any unlabeled datapoints in the training dataset. Data-driven active learning and the clean dataset are used by the processor(s) to facilitate generating an active-learned dataset with true labels added for one or more selected datapoints of a datapoint pool including the detected noisy labeled datapoints and the unlabeled datapoints of the training dataset. The machine-learning model is trained by the processor(s) using, at least in part, the clean dataset and the active-learned dataset.

18 Claims, 10 Drawing Sheets

(56) References Cited

OTHER PUBLICATIONS

Lee, et al., Robust Inference via Generative Classifiers for Handling Noisy Labels, Proceedings of the 36 th International Conference on Machine Learning, 2019, pp. 1-10 (Year: 2019).*

Mel et al., "The NIST Definition of Cloud Computing," National Institute of Standards and Technology, Information Technology Laboratory, Special Publication 800-145, Sep. 2011 (pp. 1-7).

Wang et al., "A Recursive Ensemble Learning Approach with Noisy Labels or Unlabeled Data", IEEE Access, Digital Object Identifier 10.1109/ACCESS.2019.2904403, published Mar. 11, 2019 (12 pages).

* cited by examiner

DATA-ANALYSIS-BASED, NOISY LABELED AND UNLABELED DATAPOINT DETECTION AND RECTIFICATION FOR MACHINE-LEARNING

BACKGROUND

Machine-learning provides computers with the ability to continue learning without being pre-programmed. Machine-learning utilizes algorithms that learn from data and create insights based on the data, such as making predictions or decisions.

A training dataset in machine-learning is the data used to train a model to solve a problem, provide relevant recommendations, perform an action, etc. Supervised learning refers to the task of inducing a learning function from a set of labeled data examples so the function can map between the input (features) and the output (target label) in the training examples. After training, the created model should be able to generalize and correctly predict class labels for unseen datapoints. Therefore, supervised learning algorithms require a large set of noise-free labeled data to train their models, since using datapoints with noisy or missing class labels can produce distorted models that lead to incorrect predictions. However, creating and maintaining labeled datasets is an expensive, labor-intensive activity. With the rise of deep learning, the traditional approach of manual labeling training data becomes economically infeasible due to cost and requiring domain experience. Moreover, since deep learning models require massive amounts of training data to perform well, obtaining labeled datasets for training becomes a significant bottleneck in machine-learning.

SUMMARY

The shortcomings of the prior art are overcome and additional advantages are provided through the provision, in one or more aspects, of a computer-implemented method which includes obtaining, by one or more processors, a training dataset for use in training a machine-learning model, and applying, by the one or more processors, ensemble machine-learning and a generative model to the training dataset to detect noisy labeled datapoints in the training dataset and create a clean dataset with preliminary labels added for unlabeled datapoints in the training dataset. Further, the computer-implemented method includes using, by the one or more processors, data-driven active learning and the clean dataset to facilitate generating an active-learned dataset with true labels added for one or more selected datapoints of a datapoint pool including the detected noisy labeled datapoints and the unlabeled datapoints of the training dataset, and training, by the one or more processors, the machine-learning model using, at least in part, the clean dataset and the active-learned dataset.

Systems and computer program products relating to one or more aspects are also described and claimed herein. Further, services relating to one or more aspects are also described and can be claimed herein.

Additional features and advantages are realized through the techniques described herein. Other embodiments and aspects of the invention are described in detail herein and are considered a part of the claimed aspects.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Figure 1:
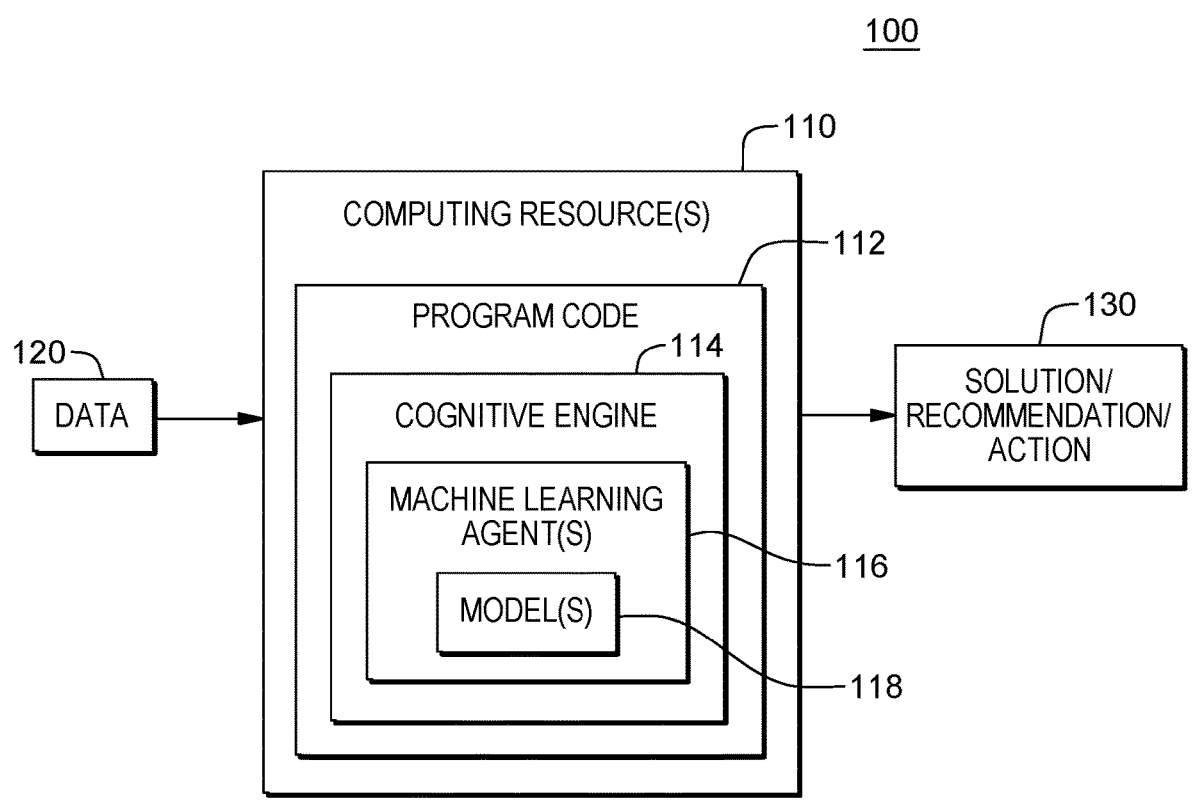
FIG. 1 depicts one embodiment of a system, illustrating certain aspects of an embodiment of the present invention.

The accompanying figures, in which like reference numerals refer to identical or functionally similar elements throughout the separate views, and which are incorporated in and form a part of this specification, further illustrate the present invention and, together with the detailed description of the invention, serve to explain aspects of the present invention. Note in this regard that descriptions of well-known systems, devices, processing techniques, etc., are omitted so as to not unnecessarily obscure the invention in detail. It should be understood, however, that the detailed description and this specific example(s), while indicating aspects of the invention, are given by way of illustration only, and not limitation. Various substitutions, modifications, additions, and/or other arrangements, within the spirit or scope of the underlying inventive concepts will be apparent to those skilled in the art from this disclosure. Note further that numerous inventive aspects and features are disclosed herein, and unless inconsistent, each disclosed aspect or feature is combinable with any other disclosed aspect or feature as desired for a particular application of the concepts disclosed herein.

Note also that illustrative embodiments are described below using specific code, designs, architectures, protocols, layouts, schematics, or tools only as examples, and not by way of limitation. Furthermore, the illustrative embodiments are described in certain instances using particular software, tools, or data processing environments only as example for clarity of description. The illustrative embodiments can be used in conjunction with other comparable or similarly purposed structures, systems, applications, or architectures. One or more aspects of an illustrative embodiment can be implemented in hardware, software, or a combination thereof.

Figure 9:
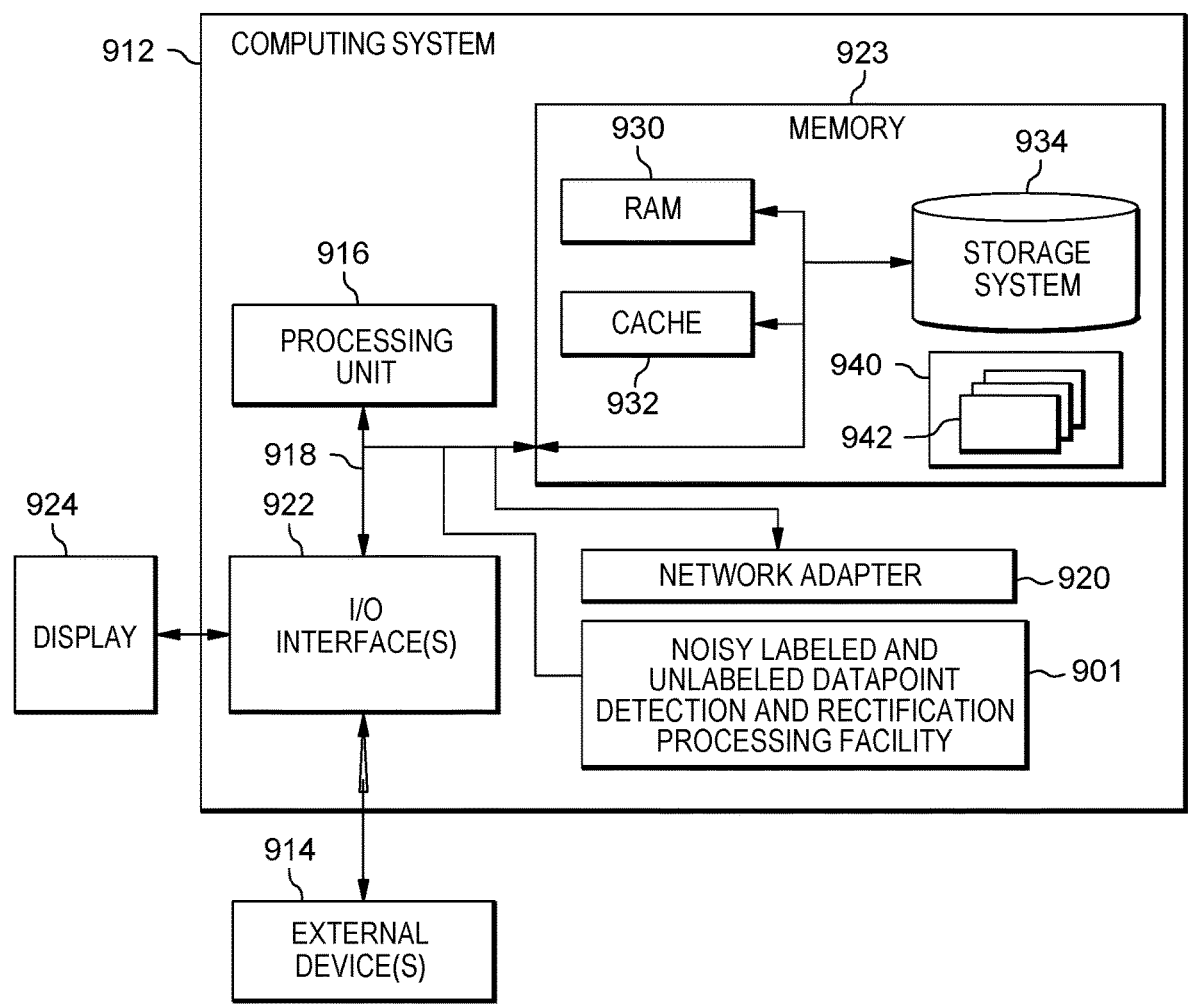
FIG. 9 depicts one embodiment of a computing node or system to implement or facilitate implementing label noise detection and rectification in a training dataset for machine-learning processing, in accordance with one or more aspects of the present invention.

As understood by one skilled in the art, program code, as referred to in this application, can include both software and hardware. For example, program code in certain embodiments of the present invention can include fixed function hardware, while other embodiments can utilize a software-based implementation of the functionality described. Certain embodiments combine both types of program code. One example of program code, also referred to as one or more programs, is depicted in FIG. 9 as program/utility 940, having a set (at least one) of program modules 942, which can be stored in memory 923.

As noted, machine-learning provides computers with the ability to continually learn without being preprogrammed. Machine-learning utilizes algorithms that learn from data and create insights based on the data, such as provide relevant recommendations, solve problems, perform actions, etc. A machine-learning algorithm needs data to learn from. Supervised learning refers to the task of inducing a learning function from a set of labeled examples so the function can map between the input (features) and the output (target label) in the training examples. After training, the created model should be able to generalize and correctly predict class labels for unseen datapoints. Therefore, supervised learning algorithms require large sets of noise-free labeled data to train the models, since using datapoints with noisy or missing class labels can produce distorted models that lead to incorrect predictions. However, obtaining ideal datasets forms a challenge in most real-world applications. Due to the cost of manually labeling, acquiring fully-labeled datasets can be difficult, economically infeasible, or even impossible. With the increasing use of deep learning, the traditional approach of manually labeling datasets becomes economically infeasible. Moreover, since deep learning models require massive amounts of training data to perform well, obtaining labeled datasets can be a significant bottleneck in machine-learning. Advantageously, disclosed herein, in one or more aspects, are processes which reduce the cost and remove much of the human activity conventionally required to create a labeled training dataset for machine-learning.

In one or more aspects, machine-learning models are data-intensive applications, where data quality has a significant effect on model performance. Since acquiring hand-labeled training data can be prohibitively expensive, weak supervision can be relied on to collect labeled datasets. However, low-cost approaches, such as crowd-sourcing and user-defined heuristics, produce low-quality annotated data with data label noise, which negatively effects the performance of the subsequent model(s). Since data quality issues can harm the performance of the final model(s), this can also add to a considerable amount of cost to re-train the model(s). In these cases, a user may need to recollect and annotate the data a second time, which can require a significant amount of time, and add cost to the process. Thus, disclosed herein, in one or more aspects, are data-analysis-based processes that assist in using training datasets collected with weak supervision, by enhancing the quality of the labeled data.

In one or more aspects, the data-analysis-based processing disclosed herein focuses on two types of weak supervision, that is, inaccurate supervision and incomplete supervision. Inaccurate supervision refers to datasets in which a portion of the datapoints, or provided examples, are incorrectly labeled. The problem of learning with inaccurate supervision is also referred to as "learning with class noise" and "learning from mislabeled examples". In incomplete supervision, only a subset of the training data is provided with labels, while the remaining datapoints are unlabeled. In application, the amount of class-labeled examples may not be enough to produce a desired classifier.

Disclosed herein, in one or more aspects, is a new classification process for machine-learning that applies ensemble learning and data-driven rectification to handle a training dataset with both inaccurate supervision and incomplete supervision present in the training dataset.

Embodiments of the present invention include a computer-implemented method, a system, and a computer program product, where program code executing on one or more processors obtains a training dataset for use in training a machine-learning model. Embodiments of the present invention further include program code that applies ensemble machine-learning and a generative model to the training dataset to detect noisy labeled datapoints in the training dataset, and create a complete or clean dataset with preliminary labels added for any unlabeled datapoints in the training dataset. Embodiments of the present invention also include program code that uses data-driven active learning and the clean dataset to facilitate generating an active-learned dataset with true labels added for one or more selected datapoints of a datapoint pool including the detected noisy labeled datapoints and the unlabeled datapoints of the training dataset. Embodiments of the present invention further include program code that trains the machine-learning model using, at least in part, the clean dataset and the active-learned dataset.

In certain embodiments, applying ensemble machine-learning includes applying ensemble machine-learning to the training dataset to build a set of base learners to produce ensemble predictions for datapoint labels in the training dataset, and using, by the generative model, ensemble predictions in detecting the noisy labeled datapoints in the training dataset. In one or more embodiments of the present invention, program code executing on the one or more processors learns the generative model to estimate accuracy of the ensemble predictions for the datapoint labels in the training dataset, including the detected noisy labeled datapoints.

In certain implementations, program code executing on the one or more processors uses the generative model to generate a vector of probabilistic labels which denote the generative model's confidence in datapoint labels in the training dataset, and based thereon, to create the complete or clean dataset, and a noisy dataset for use in the data-driven active learning, along with the vector of probabilistic labels produced by the generative model.

In one or more embodiments of the present invention, using data-driven active learning includes training a regression model to estimate a reduction in a generalization error associated with labeling of datapoints in the datapoint pool of noisy labeled datapoints and unlabeled datapoints, and selecting one or more datapoints of the datapoint pool with a highest reduction in generalization error for user label rectification. In certain embodiments of the present invention, program code trains the regression model using the complete or clean dataset to create sets of labeled datapoints to train and test the regression model, and applies the regression model as a query strategy to rank datapoints in the datapoint pool of noisy labeled datapoints and unlabeled datapoints to facilitate selecting the one or more datapoints from the datapoint pool expected to result in the highest reduction in generalization error for user label rectification.

In one or more embodiments of the present invention, program code executing on the one or more processors creates a completely labeled dataset by combining the clean dataset and the actively-learned dataset containing the one or more selected datapoints receiving true labels from the user.

In one or more embodiments of the present invention, program code executing on the one or more processors implements the data-driven active learning as meta-data-driven active learning to facilitate generating the active-learned dataset with true labels added for multiple selected datapoints of the datapoint pool.

In certain embodiments of the present invention, program code executing on the one or more processors combines the active-learned dataset and the clean dataset to provide a completely labeled dataset, and the training includes using the completely labeled dataset in training the machine-learning model.

Embodiments of the present invention are inextricably tied to computing and provide significantly more than existing approaches to machine-learning. For instance, embodiments of the present invention provide program code executing on one or more processors to exploit the interconnectivity of various systems, as well as to utilize various computing-centric data analysis and handling techniques, in order to obtain a training dataset for use in training a machine-learning model, apply ensemble machine-learning and a generative model to the training dataset to facilitate detecting noisy labeled datapoints in the training set, and facilitate creating a clean dataset with initial or preliminary labels added for any unlabeled datapoints in the training dataset, use the clean dataset and data-driven active learning to facilitate generating an active-learned dataset with true labels added for one or more selected datapoints of a datapoint pool including the detected noisy labeled datapoints and the unlabeled datapoints of the training dataset, and train the machine-learning model using, at least in part, the clean datasets and the active-learned datasets. Both the interconnectivity of computing systems utilized and the computer-exclusive data processing techniques utilized by the program code, enable various aspects of the present invention. Further, embodiments of the present invention provide significantly more than any existing approaches to machine-learning by providing classification processing that applies ensemble learning and data-driven rectification to handle both inaccurate supervision datapoints and incomplete supervision datapoints in a training dataset.

In embodiments of the present invention, the program code provides significantly more functionality, including but not limited to: 1) program code that obtains a training dataset for use in training a machine-learning model; 2) program code that applies ensemble learning and a generative model to the training dataset to detect noisy labeled datapoints in the training dataset, and create a clean dataset with initial or preliminary labels added for any unlabeled datapoints in the training dataset; 3) program code that uses the clean dataset and data-driven active learning to facilitate generating an active-learned dataset with true labels added for one or more selected datapoints of a datapoint pool including the detected noisy labeled datapoints and the unlabeled datapoints of the training dataset; and 4) program code that trains the machine-learning model using, at least in part, the clean dataset and the active-learned dataset.

FIG. 1 depicts one embodiment of a system 100, illustrating certain aspects of an embodiment of the present invention. System 100 includes one or more computing resources 110 that execute program code 112 that implements a cognitive engine 114, which includes one or more machine-learning agents 116, and one or more machine-learning models 118. Data 120, such as one or more datasets, are used by cognitive engine 114, to train model(s) 118, to generate one or more solutions, recommendations, actions 130, etc., based on the particular application of the machine-learning model. In implementation, system 100 can include, or utilize, one or more networks for interfacing various aspects of computing resource(s) 110, as well as one or more data sources providing data 120, and one or more systems receiving the output solution, recommendation, action, etc., 130 of machine-learning model(s) 118. By way of example, the network can be, for instance, a telecommunications network, a local-area network (LAN), a wide-area network (WAN), such as the Internet, or a combination thereof, and can include wired, wireless, fiber-optic connections, etc. The network(s) can include one or more wired and/or wireless networks that are capable of receiving and transmitting data, including training datasets for the machine-learning model, and an output solution, recommendation, action, of the machine-learning model, such as discussed herein.

In one or more implementations, computing resource(s) 110 houses and/or executes program code 112 configured to perform methods in accordance with one or more aspects of the present invention. By way of example, computing resource(s) 110 can be a server or other computing-system-implemented resource(s). Further, for illustrative purposes only, computing resource(s) 110 in FIG. 1 is depicted as being a single computing resource. This is a non-limiting example of an implementation. In one or more other implementations, computing resource(s) 110, by which one or more aspects of machine-learning processing such as discussed herein are implemented, could, at least in part, be implemented in multiple separate computing resources or systems, such as one or more computing resources of a cloud-hosting environment, by way of example.

Briefly described, in one embodiment, computing resource(s) 110 can include one or more processors, for instance, central processing units (CPUs). Also, the processor(s) can include functional components used in the integration of program code, such as functional components to fetch program code from locations in such as cache or main memory, decode program code, and execute program code, access memory for instruction execution, and write results of the executed instructions or code. The processor(s) can also include a register(s) to be used by one or more of the functional components. In one or more embodiments, the computing resource(s) can include memory, input/output, a network interface, and storage, which can include and/or access, one or more other computing resources and/or databases, as required to implement the machine-learning processing described herein. The components of the respective computing resource(s) can be coupled to each other via one or more buses and/or other connections. Bus connections can be one or more of any of several types of bus structures, including a memory bus or a memory controller, a peripheral bus, an accelerated graphics port, and a processor or local bus, using any of a variety of architectures. By way of example, but not limitation, such architectures can include the Industry Standard Architecture (ISA), the micro-channel architecture (MCA), the enhanced ISA (EISA), the Video Electronic Standard Association (VESA), local bus, and peripheral component interconnect (PCI). Examples of a computing resource(s) or a computer system(s) which can implement one or more aspects disclosed herein are described further below with reference to FIGS. 9-11.

As noted, program code 112 executes, in one implementation, a cognitive engine 114 which includes one or more machine-learning agents 116 that facilitate training one or more machine-learning models 118. The machine-learning models are trained using one or more training datasets that include a variety of types of data, depending on the model and the data sources. In one or more embodiments, program code 112 executing on one or more computing resources 110 applies machine-learning algorithms of machine-learning agent 116 to generate and train the model(s), which the program code then utilize to perform the skill (e.g., provide a solution, make a recommendation, perform an action, etc.). In an initialization or learning stage, program code 112 trains one or more machine-learning models 118 using a received or obtained training dataset that can include, in one or more embodiments, correctly-labeled datapoints, noisy or incorrectly-labeled datapoints, and unlabeled datapoints, with the training dataset being, for instance, weak supervision training data, such as described herein.

Figure 2:
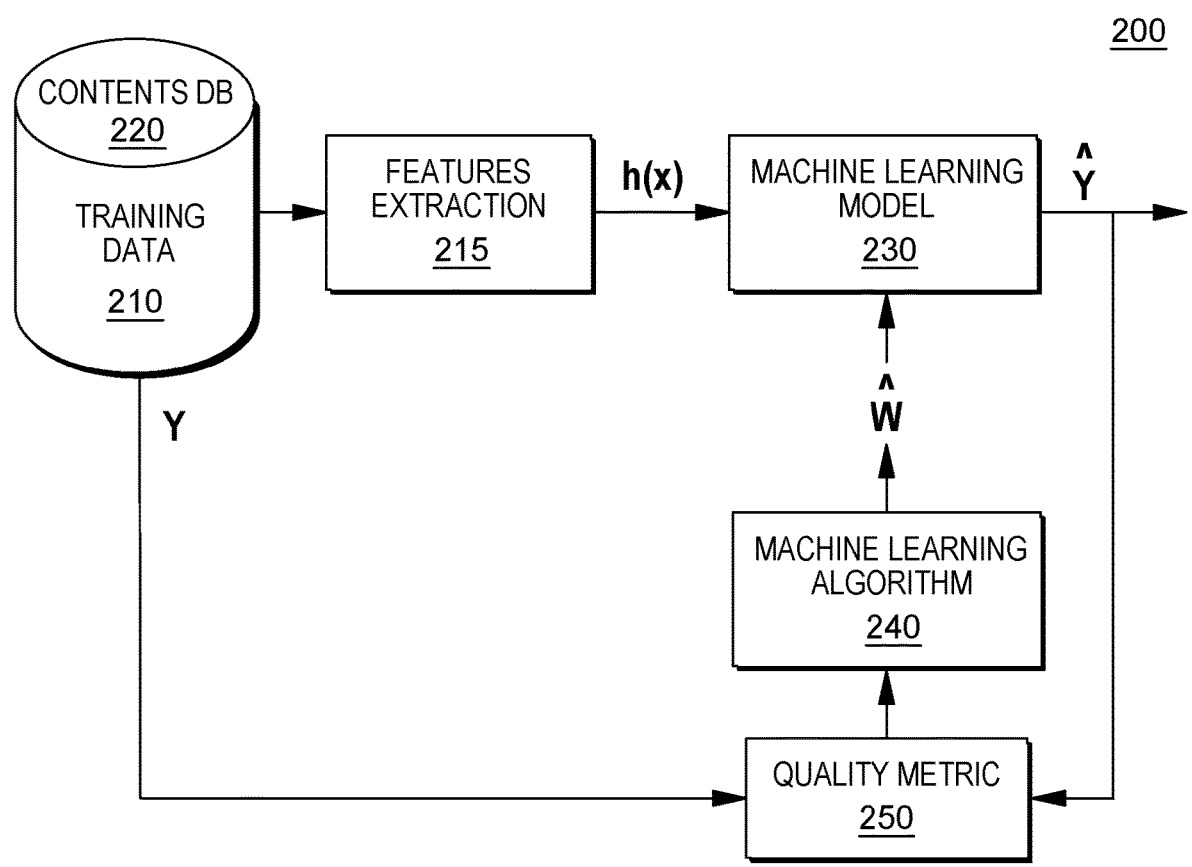
FIG. 2 illustrates various aspects of some embodiments of the present invention.

FIG. 2 is an example machine-learning training system 200 that can be utilized to perform machine-learning, such as described herein. Training data or dataset 210 used to train the model (in embodiments of the present invention) can include a variety of types of data, such as data generated by one or more devices or computer systems in communication with the computing resource(s) 110. Program code, in embodiments of the present invention, can perform machine-learning analysis to generate data structures, including algorithms utilized by the program code to perform a machine-learning skill, function, action, etc. As known, machine-learning (ML) solves problems that cannot be solved by numerical means alone. In this ML-based example, program code extract features/attributes from training data 210, which can be stored in memory or one or more databases 220. The extracted features 215 are utilized to develop a predictor function, h(x), also referred to as a hypothesis, which the program code utilizes as a machine-learning model 230. In identifying machine-learning model 230, various techniques can be used to select features (elements, patterns, attributes, etc.), including but not limited to, diffusion mapping, principle component analysis, recursive feature elimination (a brute force approach to selecting features), and/or a random forest, to select the attributes related to the particular model. Program code can utilize a machine-learning algorithm 240 to train machine-learning model 230 (e.g., the algorithms utilized by program code), including providing weights for conclusions, so that the program code can train any predictor or performance functions included in the machine-learning model 240. The conclusions can be evaluated by a quality metric 250. By selecting a diverse set of training data 210, the program code trains the machine-learning model 240 to identify and weight various attributes (e.g., features, patterns) that correlate to enhanced performance of the machine-learned model.

Some embodiments of the present invention can utilize IBM Watson® as learning agent. IBM Watson® is a registered trademark of International Business Machines Corporation, Armonk, New York, USA. In embodiments of the present invention, the respective program code can interface with IBM Watson® application program interfaces (APIs) to perform machine-learning analysis of obtained data. In some embodiments of the present invention, the respective program code can interface with the application programming interfaces (APIs) that are part of a known machine-learning agent, such as the IBM Watson® application programming interface (API), a product of International Business Machines Corporation, to determine impacts of data on the machine-learning model, and to update the model, accordingly.

In some embodiments of the present invention, certain of the APIs of the IBM Watson® API include a machine-learning agent (e.g., learning agent) that includes one or more programs, including, but not limited to, natural language classifiers, Retrieve-and-Rank (i.e., a service available through the IBM Watson® developer cloud that can surface the most relevant information from a collection of documents), concepts/visualization insights, tradeoff analytics, document conversion, natural language processing, and/or relationship extraction. In an embodiment of the present invention, one or more programs can be provided to analyze data obtained by the program code across various sources utilizing one or more of, for instance, a natural language classifier, Retrieve-and-Rank APIs, and tradeoff analytics APIs.

In some embodiments of the present invention, the program code utilizes a neural network to analyze training data and/or collected data to generate an operational model or machine-learning model. Neural networks are a programming paradigm which enable a computer to learn from observational data. This learning is referred to as deep learning, which is a set of techniques for learning in neural networks. Neural networks, including modular neural networks, are capable of pattern (e.g., state) recognition with speed, accuracy, and efficiency, in situations where datasets are mutual and expansive, including across a distributed network, including but not limited to, cloud computing systems. Modern neural networks are non-linear statistical data modeling tools. They are usually used to model complex relationships between inputs and outputs, or to identify patterns (e.g., states) in data (i.e., neural networks are non-linear statistical data modeling or decision-making tools). In general, program code utilizing neural networks can model complex relationships between inputs and outputs and identified patterns in data. Because of the speed and efficiency of neural networks, especially when parsing multiple complex datasets, neural networks and deep learning provide solutions to many problems in multi-source processing, which program code, in embodiments of the present invention, can utilize in implementing a machine-learning model, such as described herein.

Figure 3:
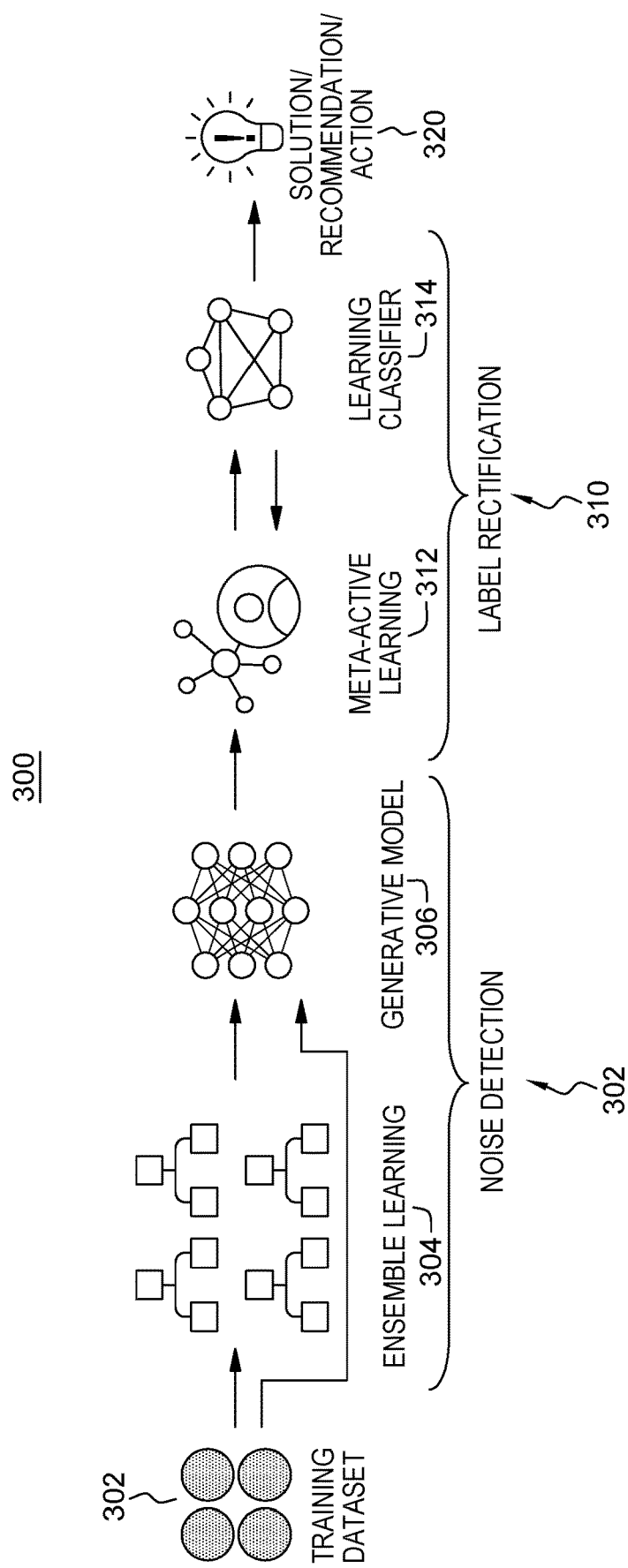
FIG. 3 is a workflow that illustrates certain aspects of some embodiments of the present invention.

FIG. 3 depicts one embodiment of a process or workflow 300, in accordance with one or more aspects of the present invention. In the embodiment of FIG. 3, process 300 includes a noisy label detection phase 302, and a label rectification phase 310. More particularly, process 300 is a new classification model or process that applies ensemble learning and data-driven rectification to handle both scenarios of inaccurate and incomplete supervision. In noise detection phase 302, a preliminary stage of ensemble learning 304 is applied to the obtained training dataset 302 to estimate the probability of each instance (i.e., each datapoint) being mislabeled, and to produce initially weak or preliminary labels for any unlabeled data in the training dataset. A generative model 306 facilitates processing in the noise detection phase 302 to provide a clean or complete dataset $D_{clean}$, which is provided to label rectification phase 310. Label rectification phase 310 applies a smart correcting procedure using meta-active learning 312 to facilitate providing true labels for one or more, or all, noisy and unlabeled datapoints in the training dataset in order to facilitate training the machine-learning model, or learning classifier 314 to provide the desired solution, recommendation, action, etc., 320.

Advantageously, unlike traditional noise-filtering approaches, process 300 of FIG. 3 does not rely on either or majority or consensus voting. Although certain studies show that majority filtering can outperform consensus voting with small heterogeneous ensembles, majority voting may not be that effective, since agreement rates become close to consensus filtering. Also, deciding on the agreement rate can be a challenge in most ensemble-filtering techniques. Therefore, process 300 in FIG. 3 addresses this challenge by leveraging semi-supervised learning techniques to automatically learn the accuracy of the ensemble prediction and choose the threshold for labeled noise detection. Also, the process of FIG. 3 learns a generative model to produce predictions for the unlabeled portion of the data, and also applies meta-active learning to enhance the accuracy of the output of the generative model, and improve the overall classification performance. Thus, the process disclosed herein achieves better performance when compared to semi-supervised techniques.

As noted, numerous inventive aspects and features are disclosed herein. For instance, in one or more aspects, a novel approach for label noise detection is presented as a first phase. In this phase, a generative model is used to estimate the accuracy of the weak dataset source and any statistical dependency of outputs. By limiting the number of weak sources to include the output of the ensemble learning, and the original noisy labels, the model can learn the structure for the sources with a sample complexity that only scales sub-linearly with the number of binary dependencies. Further, the process disclosed herein applies a novel meta-active learning approach to design the query strategy. The design process is articulated as a regression problem, in which a model is trained to estimate the reduction in the generalization error associated with labeling each datapoint. Then, only the datapoints with the highest reduction in generalization error are selected and rectified by a user, or oracle. Typically, inaccurate supervision and incomplete supervision in the training dataset are treated as separate problems. However, in real-world applications, they can occur simultaneously. Therefore, the process disclosed herein presents a new classification model that applies ensemble learning and data-driven rectification to handle both scenarios of inaccurate and incomplete supervision at the same time.

Performance of the process disclosed herein has been compared with state of the art techniques dealing with inaccurate supervision, and dealing with incomplete supervision. Testing to evaluate classification performance, noise detection, and accuracy of corrected labels, was performed with experiments to explore a wide range of classification tasks, including binary and multi-classification problems, with multiple datasets that vary in size and dimensionality. The empirical results show that the process flow disclosed herein can significantly, statistically outperform state of the art techniques, while achieving high specificity, especially with high rates of noise. The processing disclosed herein can advantageously detect significantly more noisy datapoints than convention techniques on average, and with incomplete supervision scenarios, the results empirically demonstrate the process disclosed herein produces high-accuracy labels for unlabeled datapoints, and outperforms existing semi-supervised techniques in classification performance.

As noted, in one or more embodiments, the process disclosed herein aims at inducing a classifier f: X→Y using a training dataset D as the training data. The process creates highly-generalizable learning models, even when a large portion of the training data is mislabeled or unlabeled. To achieve this, the process is divided into two main phases, namely noise detection via ensemble learning, and iterative label rectification using meta-active learning. A more detailed embodiment of is depicted in FIG. 4.

Figure 4:
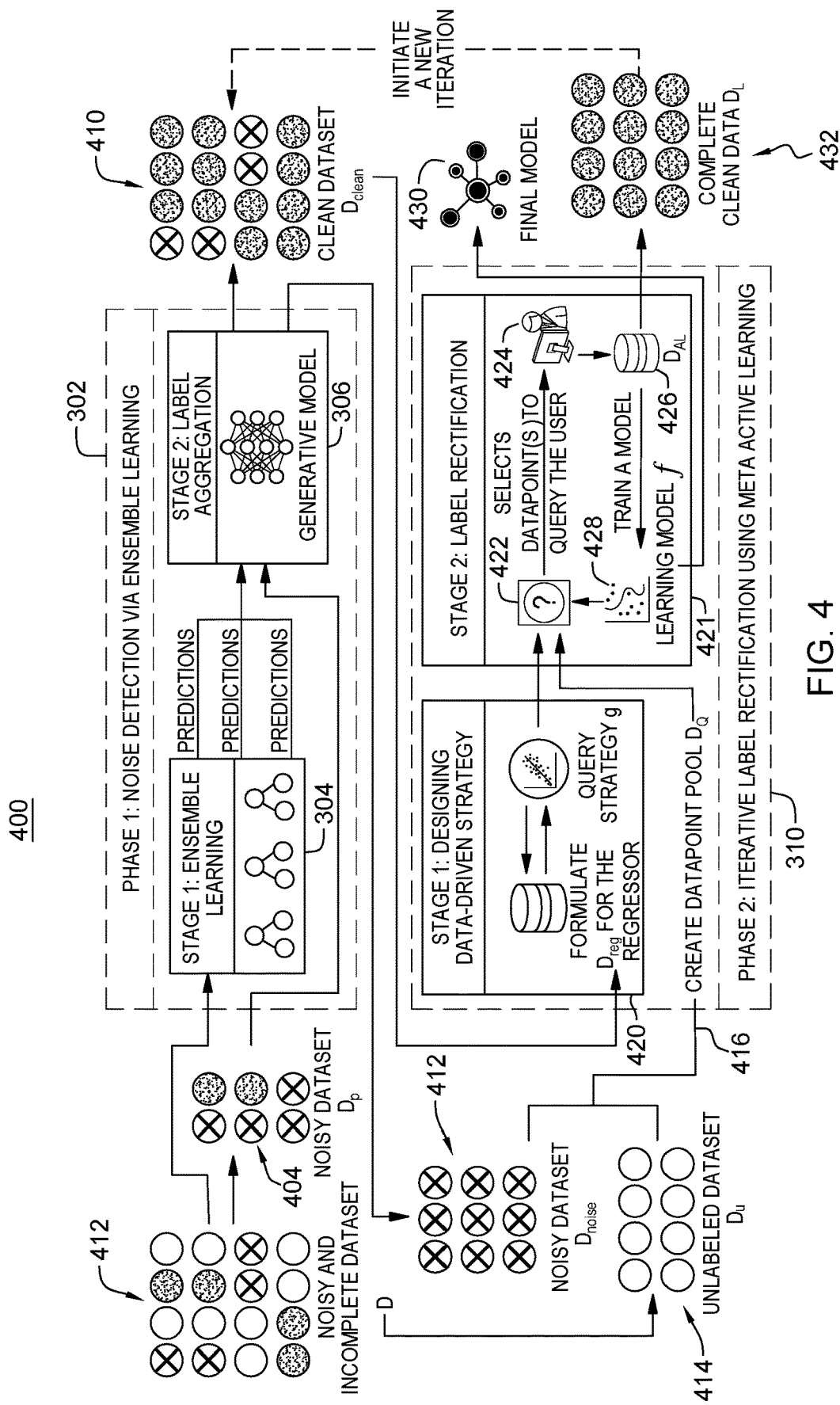
FIG. 4 is a more detailed workflow that illustrates certain aspects of some embodiments of the present invention.

As illustrated in the embodiment of FIG. 4, in first phase 302, the process exploits different bootstrap samples from the noisy dataset $D_p$ 404 to create a set of base classifiers. In conventional filtering approaches, misclassified instances are assumed to be noisy and removed. However, deleting noisy instances can be unfavorable, especially when the data is expensive to acquire, or misidentified as noisy. Therefore, the processes disclosed herein use ensemble learning 304 in combination with the original dataset D and generative model 306 to estimate the labeling confidence of each datapoint in $D_p$, and to produce a set of initial or preliminary probabilistic labels for unlabeled datapoints of the unlabeled dataset $D_u$ 414 to produce a complete or clean dataset ($D_{clean}$) 410. In second phase 310, the process addresses the problem of selecting which datapoints should be labeled by a user or oracle. Second phase 310 begins with designing a query strategy 420 that is customized to consider the underlying data distribution and labeling confidence results obtained from first phase 302. The query strategy is then applied to facilitate rectifying the datapoints with the noisy labels, provide true labels for unlabeled points in the unlabeled dataset $D_u$, and improve the classifier performance to make predictions for unseen instances.

More particularly, FIG. 4 depicts one embodiment of a more-detailed process 400, in accordance with one or more aspects of the present invention. As illustrated, a training dataset, which is a noisy and incomplete dataset D 402, is received, from which a noisy dataset $D_p$ is obtained. Noisy and incomplete dataset 402 is input to ensemble learning stage 304 to facilitate noise detection. As noted, noise detection via ensemble learning 304 aims to detect datapoints with noisy labels in noisy dataset $D_p$, and produce initial or preliminary labels for unlabeled datapoints in $D_u$ for inclusion in the clean dataset ($D_{clean}$) 410. Noise detection via ensemble learning phase 302 employs a set of ensembles in two stages. In the first stage, a set of base learners are built to produce predictions for the datapoints in the noise and incomplete dataset D. Then, the ensemble predictors are used in the second stage to detect noisy datapoints (i.e., noise data $D_{noise}$ 412) in noisy dataset $D_p$. The second stage takes the noisy dataset $D_p$ as an input, along with the out-of-bag dataset, to estimate the generalization error of the ensembles. As for creating the ensemble, randomized ensembles can be used, such as random forests, in which each classifier is trained on bootstrap samples of the noisy dataset $D_p$.

Figure 5:
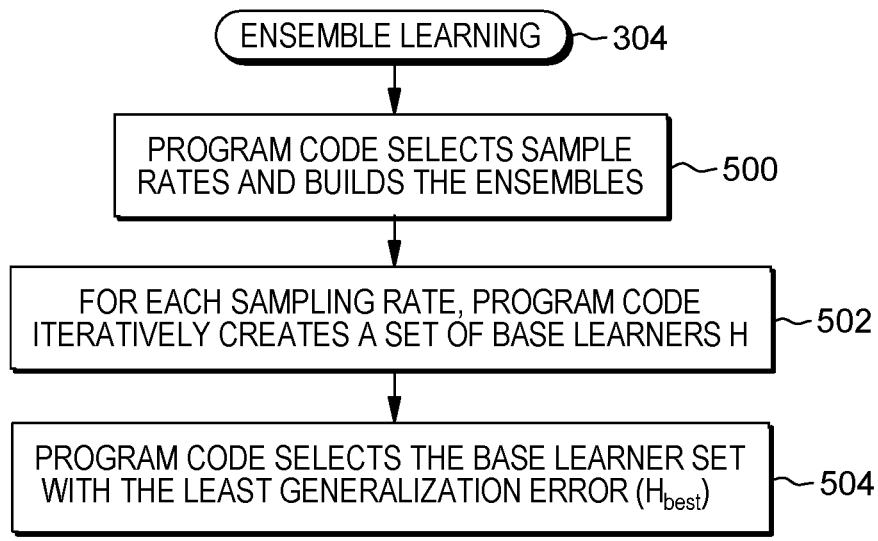
FIG. 5 depicts an embodiment of ensemble learning processing for the workflow of FIGS. 3 & 4, according to one or more embodiments of the present invention.

By way of example, FIG. 5 depicts one embodiment of ensemble learning 304. Ensemble learning process 304 begins with deciding on the sampling rates and building the ensembles 500. For each sampling rate, program code iteratively creates a set of base learners H 502. In one embodiment, the process uses the out-of-bag dataset to evaluate the generalization error of the ensemble. The set with the least generalization error $H_{best}$ is selected for the next stage 504. Thus, an unbiased selection of the ensembles is made, regardless of the amount of data noise.

In second stage 306 of noise detection ensemble learning 302 of FIG. 4, the base learner set with the least generalization error ($H_{best}$) is used to produce labels for unlabeled datapoints in the noisy and incomplete dataset D, and to detect noise in the noisy dataset $D_p$. To avoid the overhead of having to determine the filtering threshold for each classification problem, the process can formulate the problem, at this point, using weak supervision settings. Since both the output of the ensemble and the original labels in the noisy and incomplete dataset D contain label noise, and hence, can be considered as low-quality sources, the data can be treated as two data sources of weak supervision.

Figure 6:
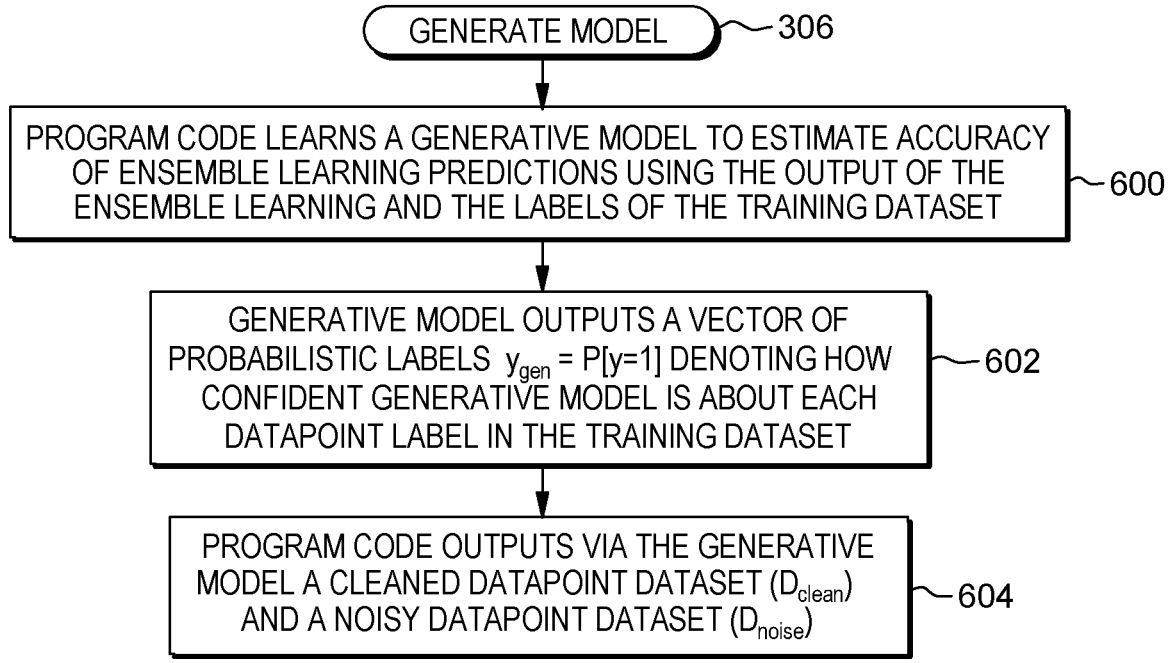
FIG. 6 depicts an embodiment of label aggregation processing for the workflow of FIGS. 3 & 4, according to one or more embodiments of the present invention.

As illustrated in FIG. 6, the stage 2 label aggregation process or generative model 306 includes, in one embodiment, program code learning a generative model to estimate accuracy of ensemble learning predictions using the output of the ensemble learning and the labels of the training dataset 600. For instance, to integrate training labels from multiple weak sources, the label aggregation process learns a generative model to estimate the accuracy of the ensemble predictions for the datapoints in the noisy and incomplete dataset D, and the noisy datapoints in the noisy dataset $D_p$, before combining the two sources. The process addresses the scalability issue of learning a generative model for higher-degree dependencies by limiting the number of weak sources to include the output of the ensemble and the original labels in the noisy and incomplete dataset D. Hence, the generative model can learn the structure for the sources, with a sample complexity that only scales sub-linearly with the number of binary dependencies.

As illustrated in FIG. 6, the generative model outputs a vector of probabilistic labels $y_{gen}=P[y=1]$, denoting how confident the generative model is about each datapoint label in the training dataset 602. For instance, for datapoints that are misclassified by the ensemble, and therefore their labels differ from $y_n$ (i.e., the original label), the generative model will output probabilistic labels for these points that are close to 0.5.

Since the number of weak sources remains constant, regardless of the problem in question, the overhead of recalculating the filtering threshold for every problem is avoided. Further, since the generative model learns the underlying data distribution, its output can be treated as the labeling confidence and used to detect noisy points. As a result, the first phase can eliminate the noise datapoints from the noisy dataset $D_p$, moving them to a new noisy dataset $D_{noise}$, containing all the detected noisy labeled datapoints. As illustrated in FIG. 6, program code outputs via the generative model a clean datapoint dataset ($D_{clean}$) and a noisy datapoint dataset ($D_{noise}$) 604, with the clean dataset $D_{clean}$ 410 and noisy dataset $D_{noise}$ 412 being input to the iterative label rectification using meta-active learning phase 2 310 of FIG. 4.

Continuing with FIG. 4, in second phase 310, processing provides correct labels for both noisy labeled datapoints in the noisy dataset $D_p$ 412, and unlabeled datapoints in the unlabeled dataset $D_u$ 414. In particular, the iterative label rectification using meta-active learning 310 of phase two rectifies the noisy labels in $D_{noise}$, gives accurate labels to the unlabeled dataset $D_u$ 414, and induces a classifier f (machine-learning model) that is trained with datapoints from the original dataset. To accomplish this, noisy points in noisy dataset $D_{noise}$ 412 are combined or pooled with datapoints in unlabeled dataset $D_u$ 414 to form a datapoint pool $D_Q$. The issue to be resolved at this point in the process can be considered as a task of active-learning, where the goal is to give class labels to datapoints that are expected to improve the model's performance. However, the phase cannot apply traditional query strategies such as uncertainty sampling, because the problem settings differ from a traditional scenario of active-learning. While in pool-based active-learning, a small set of labeled points (seed) and unlabeled pool are used. In one or more embodiments disclosed herein, a larger seed (cleaned dataset $D_{clean}$ 410) is used, along with the datapoint pool $D_Q$, and a vector of labeling confidence $y_{gen}$ produced by the generative model for each point in dataset D. Hence, a meta-active learning approach can be used in this phase to design the query strategy. The design process can be articulated as a regression problem, in which a model is trained to estimate the reduction in the generalization error associated with labeling the points in the datapoint pool $D_Q$. Then, datapoints with the highest reduction in the generalization error are selected and rectified by a user, or oracle. Similar to the first phase 302, this phase 310 includes two main stages 420, 421. In first stage 420, a meta-active learning query strategy is designed, while in the second stage 421, the obtained strategy is applied to rectify selected datapoints.

Figure 7:
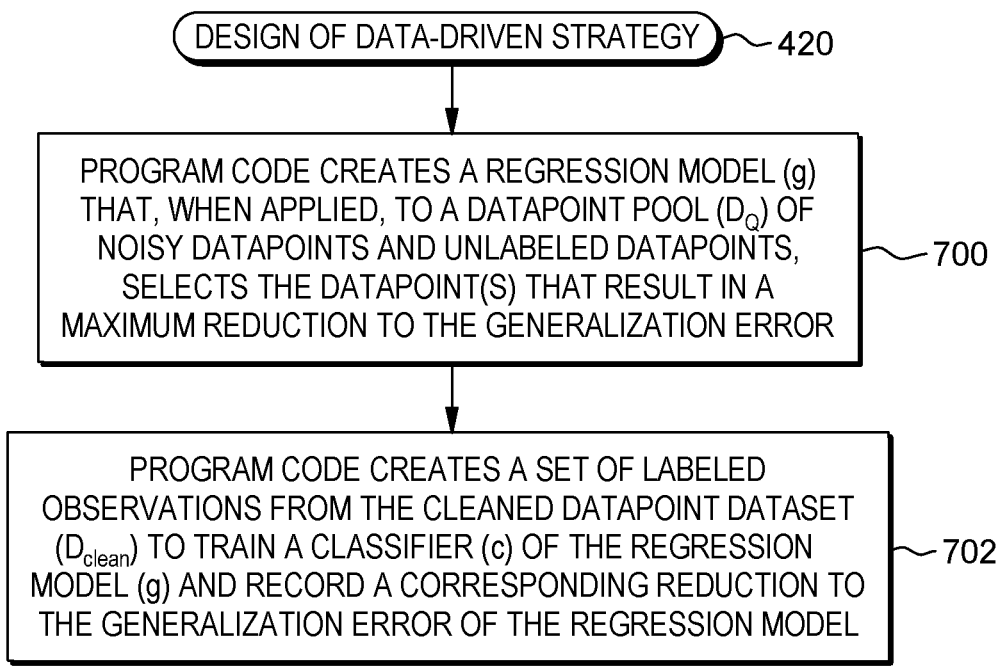
FIG. 7 depicts an embodiment of design of data-driven strategy processing, or active-learning processing, for the workflow of FIGS. 3 & 4, according to one or more embodiments of the present invention.

As illustrated in FIG. 7, in design of data-driven strategy stage 420, program code creates a regression model (g) that, when applied to datapoint pool ($D_Q$) of noisy datapoints and unlabeled datapoints, selects the datapoints that result in a maximum reduction to the generalization error 700. Program code creates a set of labeled observations from the cleaned datapoint dataset ($D_{clean}$) to train a classifier (c) of the regression model g, and record a corresponding reduction to the generalization error of the regression model 702. For instance, the cleaned datapoint dataset $D_{clean}$ can be split into a training dataset $D_{train}$ and a testing dataset $D_{test}$. Then, the datapoints in $D_{train}$ can be used iteratively to train classifier c, and record the corresponding reduction to the generalization error of the produced model.

Figure 8:
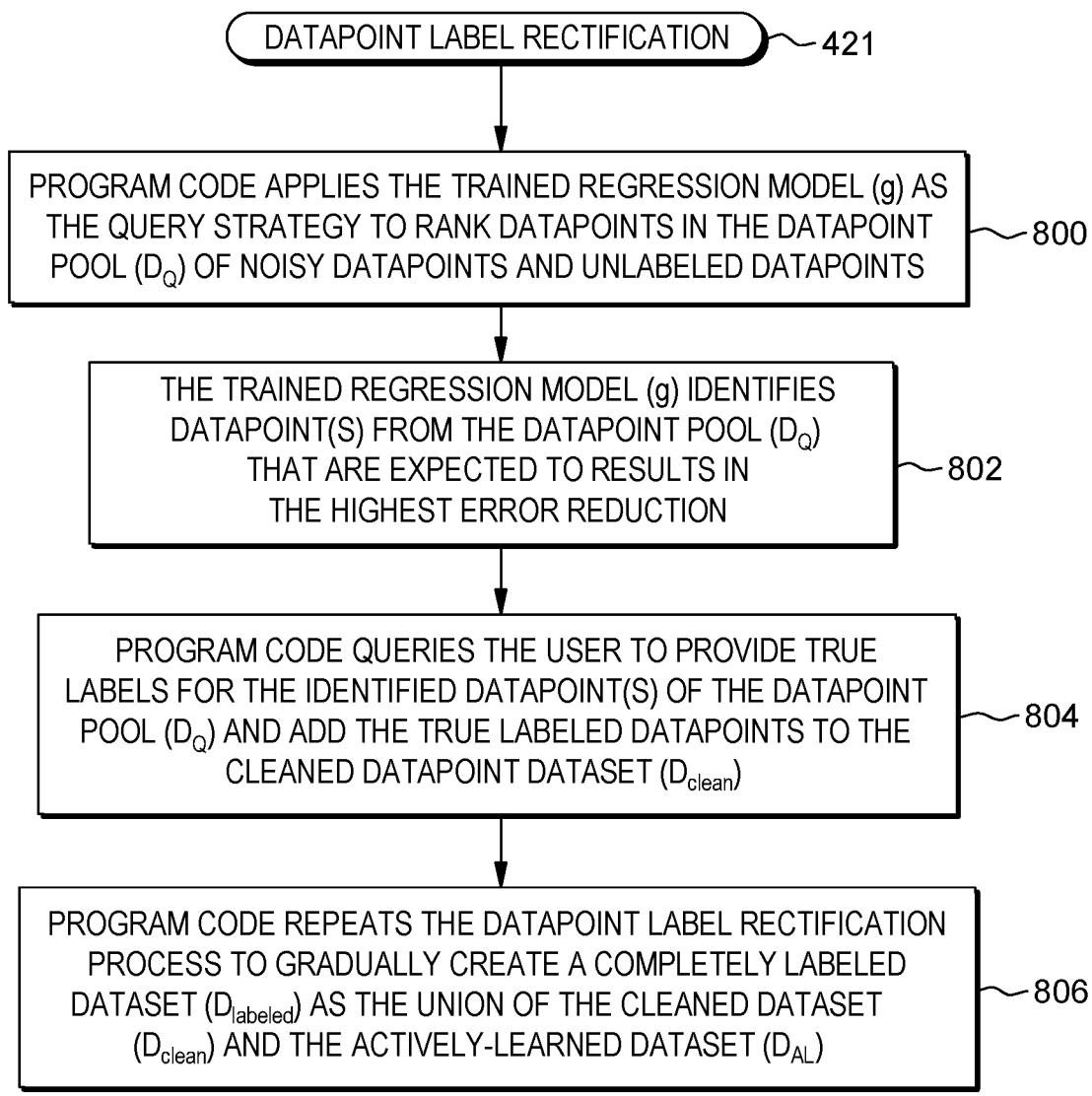
FIG. 8 depicts an embodiment of datapoint label rectification for the workflow of FIGS. 3 & 4, according to one or more embodiments of the present invention.

In the second stage 421 of iterative label rectification using meta-active learning 310 of FIG. 4, label rectification occurs. One embodiment of datapoint label rectification process 421 is illustrated in FIG. 8. Referring to FIG. 8, program code applies the trained regression model g as the query strategy to rank datapoints in the datapoint pool ($D_{pool}$) of noisy datapoints and unlabeled datapoints 800. The trained regression model g identifies datapoints from the datapoint pool that are expected to result in the highest error reduction 802.

Note that to address the cold start issue with active-learning, processing can use $D_{clean}$ as the initial seed. For instance, initially a probabilistic classifier f can be trained using $D_{clean}$. Then, in each iteration of active-learning (see FIG. 4), the points in the datapoint pool are ranked, and the regression function g selects the datapoints with the highest reduction in the generalization error.

As illustrated in FIGS. 4 & 8, program code queries 422 the user 424 to provide true labels for the identified datapoints of the datapoint pool, and adds the true labeled datapoints ($D_{AL}$) 426 to the cleaned datapoint dataset ($D_{clean}$) 804 (FIG. 8). Program code repeats the datapoint label rectification process to gradually create a labeled dataset ($D_L$) 423 (FIG. 4) as the union of the cleaned dataset $D_{clean}$ and the actively-learned dataset $D_{AL}$ 806. Note that the classifier f 428 can be retrained for each iteration through phase 2 310. The phase outputs the completely cleaned dataset $D_L$ 432 as the completely cleaned version of the original noisy and incomplete dataset 402, along with the classifier f 428 (i.e., machine-learning model) trained using completely cleaned dataset $D_L$ 432.

To summarize, in one or more embodiments, provided herein is a computer-implemented process, system and computer program product, where program code executing on one or more processors builds ensembles (in response to receiving a set of training data D) using at least one determined sampling rate by: creating a set of base learners H iteratively using a predetermined algorithm with a predetermined out-of-bag dataset to evaluate a generalization error associated with a respective ensemble for each of at least one determined sampling rate; and selects a set of ensembles using predetermined criteria including ensembles with a least generalization error $H_{best}$. Further, the program code executing on one or more processors assigns labels to unlabeled datapoints in the set of training data D, detects noisy datapoints $D_p$ in the set of training data using the set of training data and the ensembles as two sources of weak supervision, and integrates the training labels from the two sources of weak supervision by learning a generative model to estimate accuracy of ensemble predictions for the datapoints and training dataset D, and the noisy datapoints and dataset $D_p$, prior to combining the two sources of weak supervision as output from the ensembles in the original labels in a cleaned dataset $D_{clean}$. As part of the process, a vector of probabilistic labels is generated, using the generative model, that is indicative of confidence of the generative model regarding each class label and the training dataset D. In response to labeling confidence exceeding a predetermined threshold, the output of the generative model is used to detect noisy datapoints for noisy dataset $D_p$. Extracting the noisy datapoints from noisy dataset $D_p$ is performed to establish a new noisy dataset $D_{noise}$ containing all detected noise datapoints. The output of dataset $D_{clean}$ can be expressed as dataset $D_p$–dataset $D_{noise}$.

Further, a regression model g is created, when applied to a datapoint pool, including a combination of noisy datapoints in $D_{noise}$ and unlabeled dataset $D_u$, where the regression model chooses the datapoints that results in a maximum reduction to the generalization error. A set of labeled observations is created using dataset $D_{clean}$ split into a training dataset $D_{train}$ and a testing dataset $D_{test}$ to train and test a regressor g. A classifier c is iteratively trained using the datapoints in $D_{train}$, including a recording a corresponding reduction to the generalization error of the regression model. The regressor g is applied as a query strategy to rank the datapoints in the datapoint pool $D_Q$, and ranked datapoints are selected from the pool expected to result in the highest generalization error reduction. In response to a prompt to a user, true labels are received for the selected datapoints from the user to form a dataset $D_{AL}$ containing actively-learned true labels for the selected datapoints. The true labels for the selected datapoints are added to the dataset $D_{clean}$ to create the labeled dataset $D_L$, expressed as the union of $D_{clean}$ and $D_{AL}$. The classifier f is retrained for the next iteration using $D_{clean}$ updated to output $D_L$ as a complete clean version of D, and the process continues until the classifier f is fully trained using $D_L$.

By way of further example, a detailed embodiment of the above-described processing is presented below.

Formally, let D be an incomplete noisy dataset of size N, which can be split into two datasets: a dataset with class noise $D_p$, and an unlabeled dataset $D_u$. The noisy labeled dataset $D_p \subset D$ consists of $\{(x_i, y_{n_i})\}_{i=1}^{N_p}$, particularly, the datapoints in $D_p$ comprise $x_i \in X$, and $y_{n_i} \in Y$. While $X=R^d$ is a d-dimensional feature space, $y_{n_i} \in Y$, where $Y=\{y_1, y_2, \ldots, y_m\}$, which is the output space with m class labels. A noise rate p can also be associated with the output labels $y_n$ in $D_p$. It is assumed that $p \in (0, 0.5)$, so there are more correctly labeled instances than mislabeled instances. Additionally, let $D_u \subset D$ denotes a subset of datapoints with unknown labels consisting of $D_u = \{(x_i)\}_{i=1}^{N_u}$, where $N_u = N - N_p$.

In one embodiment of the processing disclosed herein, dealing with inaccurate and incomplete supervision involves providing the correct labels to the points in $D_u$, and relabeling the noisy data in $D_p$. Therefore, handling inaccurate supervision can be seen as a preliminary phase of identifying datapoints with noisy labels before proceeding with the classification problem. Thus, in this problem setting, it can be reduced to a special case of learning with incomplete supervision.

The processes disclosed herein are aimed at inducing a classifier f: $X \rightarrow Y$ using D as the training data. The process seeks to create highly generalizable learning models, even when a large proportion of the training data is mislabeled or unlabeled. To achieve this goal, the proposed framework is divided into two phases, namely noise detection via ensemble learning, and iterative label rectification using meta-active-learning. An overview of the two phase of the proposed system is illustrated in FIG. 4, and described above.

In the first phase, the disclosed process detects datapoints with noise labels in $D_p$ and produces initial labels for the unlabeled points in $D_u$. Therefore, the phase employs a set of ensembles in two stages. In the first stage, a set of base learners are built to produce predictions for the datapoints in D. Then, the ensemble predictor is utilized in the second stage to detect noisy points $D_{noise}$ in $D_p$.

The stage takes $D_p$ as an input along with an out-of-bag dataset to estimate the generalization error of the ensembles. As for creating the ensemble, randomized ensembles are considered, specifically, random forests, in which each classifier is trained on bootstrap samples of $D_p$. A detailed process description of one embodiment of this state is illustrated in the process flow 1 below. As the first part of the process shows (Steps 2-11), the stage starts with deciding on the sampling rate and building the ensembles. Many studies verify that having a small sampling rate can make the ensemble more robust to label noise. Therefore, the sampling rate r is shown from a range $r \in \{r_{min}, \ldots r_{max}\}$, where $r_{min}=0.1$ and $r_{max}$ 0.4, by way of example. Next, for each sampling rate, a set of base learners H is iteratively created. The algorithm uses the out-of-bag dataset to evaluate the generalization error of the ensemble. Then, the set with the least generalization error $H_{best}$ is selected for the next stage. Therefore, an unbiased selection of the ensembles is made, regardless of the amount of data noise. Although the ensemble is trained using noisy data, the phase utilizes a robust model, such as random forest, and builds the ensemble with a small sampling rate to reduce the noise effect. The ensemble predictor of $H_{best}$ is described as:

$$Y_{H_{best}=\arg\max_y} \Sigma_{j=1}^T I(h_{best_j}(x)=y) \quad (1)$$

where $h_{best_j}(x)$ is the prediction of the response variable at x using the $j^{th}$ base classifier in the ensemble $H_{best}$, and T is the ensemble size.

Accordingly, the second stage, shown in process flow 1 (Steps 12-16), utilizes $H_{best}$ to produce labels to the datapoints in D and detect noise in $D_p$. To detect noisy data, filtering approaches must decide on a threshold of erroneous ensemble predictions to classify a given instance as noise. In other words, datapoints for which the fraction of misclassified predictions given by the classifiers in the ensemble exceeds this threshold are filtered as noise. However, the optimal value of the threshold is problem-dependent, and therefore is typically estimated for each classification task. To avoid the overhead of having to determine the filtering threshold for each classification problem, the process disclosed herein formats the problem, at this point, using the weak supervision settings. As mentioned before, learning with weak supervision is based on dealing with low-quality, large-scale training examples. Since both the output of the ensemble $Y_{H_{best}}$ and the original labels D contain label noise (and hence can be considered as low-quality sources), they can be treated as two sources of weak supervision.

Process Flow 1: Noise Detection Vis Ensemble Learning.

```
Input:      D_p = {(x_i, y_ni)}_{i=1}^{Np}    = % noisy training data
            D_oob                              = % Out-of-bag data
            r                                  = % sampling_rate_range
            T                                  = % ensemble size
Output:     D_noise                            = % detected noise
            D_clean                            = % a cleaned version of D_p
            Y_gen                              = % probabilistic labels
1:          E_min = ∞
2:          for each sampling_rate in r do
3:              N_r ← sampling_rate * N_p
4:              take a bootstrap sample D_r of size N_r from D_p.
5:              create a randomized ensemble H of size T with D_r
6:              estimate the generalization error E of H using D_oob
7:              if E<E_min then
8:                  E_min = E
9:                  H_best = H
10:             end
11:         end
12:         construct the matrix of weak sources S (3)
13:         learn Ø for a generative model m_Gen (2)
14:         obtain labels y_gen using m_Gen for the points in D
15:         estimate the threshold value θ (5)
16:         using θ, detect noise from D_p and construct D_noise (6)
17:         construct the cleaned dataset D_clean = D_p - D_noise
18:         return D_noise, D_clean, and Y_gen
```

To integrate training labels from multiple weak sources, generative models can be used to estimate the accuracy of each source and any statistical dependency between their outputs. As a generative model treats the true label as a latent variable, after fitting the generative model, the distribution of the true label Y is estimated as a set of probabilistic labels. Therefore, in this stage, the disclosed process learns a generative model $m_{Gen}$ to estimate the accuracy of the ensemble predictions for the datapoints in D and the noise datapoints in $D_p$ before combining these two sources. The generative model can be formally defined as:

$$m_{Gen} : \pi_\varphi(S, Y) = \frac{1}{Z_\phi} e^{\phi^T SY} \quad (2)$$

where S is a matrix denoting the output of the weak sources, $\varphi$ is the accuracy of each source in S, and $Z_\varphi$ is a partition function to ensure $\pi$ is a distribution. The disclosed process tries to address the scalability issue of learning a generative model for higher degree dependencies by limiting the number of weak sources to include $Y_{H_{best}}$ and $y_n$. Hence, the model can learn the structure for these sources with a sample complexity that only scales sub-linearly with the number of binary dependencies. As a result, the matrix X can be defined as:

$$S_{i,j} = \begin{cases} y_{n_i} & \text{if } j = 1 \\ y_{H_{best_i}} & \text{if } j = 2 \end{cases} \text{ where } 1 \le i \le N_p, 1 \le j \le 2 \quad (3)$$

where $y_n$ is the noisy class label in $D_p$, and $Y_{H_{best}}$ is the ensemble predictor. The generative model outputs a vector of probabilistic labels $y_{gen}$=P[y=1], which denotes how confident the generative model is about each class label in D. For example, for datapoints that are misclassified by the ensemble, and therefore their labels different from $y_n$, the generative model would output probabilistic labels for these points that are close to 0.5. Thus, the points with noise labels can be defined as:

$$|P[y_i=1]-0.5| \le \theta \quad (4)$$

where $P[y_i=1]$ is the probabilistic label assigned by the generative model, and θ is a threshold to ensure that the definition of low confidence changes according to the number of the weak sources with which the generative model operates. Since the number of weak sources remains constant regardless of the problem in question, the overhead of recalculating the filtering threshold is avoided for every problem. Also, since the generative model learns the underlying data distribution, its output can be treated as the labeling confidence and used to detect noisy points. Therefore, the threshold θ can be denoted as:

$$\theta = \psi - \left(1/e^{\sqrt{k-1}}\right) \quad (5)$$

where k is the number of weak sources (in this case k=2), and ψ is the initial value before measuring the exponential decay as k increases (default ψ=⅓). In other words, it is expected to have fewer datapoints with labeling confidence close to 0.5 when the number of weak sources grows. Thus, the phase uses equation (4) to detect the points with noisy labels in $D_p$ as:

$$D_{noise} \subseteq D_n, \forall x_{n_i} \in D_{noise}\{x_i | P[y_i=1]-0.5| \le \theta\} \quad (6)$$

The phase applies the formula above to eliminate the noisy datapoints from $D_p$ in a new dataset $D_{noise}$ containing all the detected noise. The phase outputs $D_{noise}$ and $D_{clean}=D_p-D_{noise}$ and sends both datasets to the second phase. In the second phase, the proposed method aims at providing the correct labels for both these noisy labels in $D_{noise}$ and the unlabeled dataset $D_u$.

As the first phase eliminates the data with noisy labels in $D_{noise}$ and utilizes $m_{Gen}$ to produce initial (noisy) predictions to $D_u$, the second phase of label rectification using meta-active-learning has three goals, 1) to rectify the noisy labels in $D_{noise}$, 2) to give accurate labels to $D_u$, 3) to induce a classifier f that is trained with D. To accomplish these goals, the noisy points in $D_{noise}$ are combined with $D_u$ to form dataset pool $D_Q=D_u \cup D_{noise}$. The problem at this point can be considered as a task of active-learning (AL), where the goal is to give labels to the datapoints that are expected to improve the model performance.

However, the phase cannot apply traditional query strategies, such as uncertainty sampling, because the problem settings in this case differ from the traditional scenario of AL. While in pool-based AL, a small set of labeled points (seed) and an unlabeled pool are used, in the present case, a bigger seed $D_{clean}$ is used, along with a set of datapoints $D_Q$, and a vector of labeling confidence $Y_{gen}$ produced by the optimal solutions with different data distributions and noise levels.

Hence, for the above reasons, a meta-active-learning (meta-AL) approach is adopted in this phase to design the query strategy. Here the design process can be articulated as a regression problem, in which a model is trained to estimate the reduction in the generalization error associated with labeling the points in $D_Q$. Then, only the datapoints with the highest reduction in the generalization error are selected and rectified by an oracle. Similar to the first phase, this phase has two main stages. In the first stage, a meta-AL query strategy is designed, while in the second stage, the obtained strategy is applied to rectify the labels.

In the first stage, the design process of the query is framed as a regression problem. This step aims at creating a regression model g that is supposed to, when applied to $D_Q$, choose the points that result in the maximum reduction V to the generalization error. To start the process, $D_{clean}$ is used to create a set of labeled observations $D_g$ needed to train and test a regressor g. Therefore, $D_{clean}$ is split into a training set $D_{train}$ and testing set $D_{test}$. Then, the datapoints in $D_{train}$ are used to iteratively train a classifier c and record the corresponding reduction to the generalization error of the produced model.

To accomplish this task, dataset $D_{train}$ can be split into a labeled training dataset $D_{labeled}$ of size w and a data pool $D_{pool}$ containing the remaining points. Then, $D_{labeled}$ can be used to train c and produce a model $m_d$ that is used to provide predictions to the datapoints in $D_{test}$ and estimate the corresponding classifications loss $L_d$. After that, another datapoint x from the pool $D_{pool}$ can be randomly selected and added to the $D_{labeled}$, to form a new dataset $D_x = D_{labeled} \cup \{X\}$. After that, $D_x$ is utilized to train c again, create a new model $m_x$, and test this model using $D_{test}$. Similarly, the new classification Loss $L_x$ is calculated and the reduction in the classification loss $\nabla_x$ for adding x to $D_{labeled}$ is estimated as:

$$\nabla_x = L_d - L_x \qquad (7)$$

Additionally, as the reduction in the generalization error $\nabla_x$ associated with adding each point x from $D_{pool}$ to $D_{labeled}$ is being recorded, these reductions are to be associated to a set of features φ that reflect the data distribution and the labeling confidence. Thus, each point that is added to the $D_{labeled}$ can be characterized by a set of parameters $\varphi_x$ that includes the value of its labeling confidence $y_{gen}$, the distance to the closet point in the dataset, and the distance to the closest labeled point. Also, as these observations ($\varphi_x$, $\nabla_x$) are collected, $D_g$ is built iteratively using different samplings of $D_{labeled}$ with different sizes $w \in \{w_{min}, \ldots w_{max}\}$. Based on insights obtained from experiments, the process can be with different sizes equal to 30%, 50%, 70%, and 90% of the total size of $D_{labeled}$, as these ranges can result in enough observations ($\varphi_x$, $O_x$) to train an adequate regressor without affecting the time complexity.

Therefore, during each iteration, w points can be randomly sampled from $D_{train}$ and record both the features φ of w points in $D_{train}$ along with their corresponding reduction V to the generalization error. Finally, $D_g$ is used to train a regression function g to predict the error reduction of annotating the points in $D_Q$. The complete process of designing the query strategy is explained in process flow 2 below.

In the second stage of this phase, the trained regression function g is applied as the query strategy to rank the points in $D_{pool}$. The model then selects datapoints from $D_{pool}$ that are expected to result in the highest error reduction using the following formula:

$$x^* = \frac{\arg\max\, g(\varphi_x)}{x \in D_Q} \qquad (8)$$

Moreover, to overcome the cold-start problem in AL, the component uses $D_{clean}$ as the initial seed. Initially, a probabilistic classifier f is trained using Damn. Then, in each iteration of AL, the points in $D_Q$ are ranked using equation 8, and the regression function g selects the datapoints with the highest reduction in the generalization error. Next, the user is queried to provide true labels for the selected points, which are then added to $D_{clean}$. Finally, the updated Damn is then used to retrain the classifier f for the next iteration.

Therefore, the process gradually creates a labeled dataset $D_L = D_{clean} \cup D_{AL}$, where $D_{AL} = \{x_i, y^*_i\}_{i=1}^{min(B,Q)}$, represents the datapoints that received true labels from the user during this stage, and Q is the number of datapoints in $D_Q$. The AL process terminates with either $D_Q$ is completely labeled, or a predefined labeling budget B is exceeded. Therefore, the size of $D_{AL}$ is denoted as min(B,Q). Finally, the phase outputs $D_L$ as the completely clean version of D, along with the classifier f trained using $D_L$.

Moreover, as illustrated in FIG. 4, phase 2 is iterative. Therefore, another iteration can be initialed by the user. In this iteration, $D_{clean}$ is replaced with $D_L$, and another round is executed. Hence, a new query strategy is designed using $D_L$ to further enhance the final performance. However, experiments show that running only one iteration of the process can help obtain an adequate level of classification performance for real-world task and outperform state-of-the-art techniques.

Process Flow 2: Designing the Query Strategy.

| Input: | $D_{clean}$ | = % clean version of the data |
| | $D_{noise}$ | = % detected noise |
| | $D_u$ | = % the unlabeled points in D |
| | $y_{gen}$ | = % probabilistic labels produced by $m_{Gen}$ |
| Output: | g | = % regressor function (the query strategy) |
| 1: | initialize dataset $D_Q = D_u \cup D_{noise}$ | |
| 2: | create two datasets $D_{train}$ and $D_{test}$ by splitting $D_{clean}$ | |
| 3: | initialize an empty dataset $D_{reg}$ | |
| 4: | for w in $\{w_{min}, \ldots w_{max}\}$ do | |
| 5: | split $D_{train}$ into $D_{labeled}$ of size w and $D_{pool}$ | |
| 6: | train a classifier c with $D_{labeled}$ | |
| 7: | calculate the classification loss $L_d$ using $D_{test}$ | |
| 8: | for each point x in $D_{pool}$ do | |
| 9: | form a new dataset $D_x = D_{labeled} \cup \{x\}$ | |
| 10: | train the same classification algorithm c using $D_x$ | |
| 11: | calculate the new test loss $L_x$ | |
| 12: | calculate the error reduction $\nabla_x = L_d - L_x$ | |
| 13: | collect the datapoint parameters $\varphi_x$ | |
| 14: | add the labeled datapoint $\{\varphi_x, \nabla_x\}$ to $D_{reg}$ | |
| 15: | return $D_{reg}$ of size Q as ($\varphi_x$, $\nabla_x$) | |
| 16: | train a regressor g using $D_{reg}$ | |
| 17: | return g | |

Further exemplary embodiments of a computing environment to implement one or more aspects of the present invention are described below with reference to FIGS. 9-11.

By way of further example, FIG. 9 depicts one embodiment of a computing environment 900, which includes a computing system 912. Examples of well-known computing systems, environments, and/or configurations that may be suitable for use with computer system 912 include, but are not limited to, a server, a desktop computer, a work station, a wireless computer, a handheld or laptop computer or device, a mobile phone, a programmable consumer electronic device, a tablet, a personal digital assistant (PDA), and the like.

Computing system 912 can be described in the general context of computer system-executable instructions, such as program modules, being executed by a computer system. Generally, program modules include routines, programs, objects, components, logic, data structures, and so on that perform particular tasks or implement particular abstract data types.

As depicted in FIG. 9, computing system 912, is shown in the form of a general-purpose computing device. The components of computing system 912 can include, but are not limited to, one or more processors or processing units 916, a system memory 923, and a bus 918 that couples various system components including system memory 923 to processor 916.

In one embodiment, processor 916 may be based on the z/Architecture® offered by International Business Machines Corporation, or other architectures offered by International Business Machines Corporation or other companies.

Bus 918 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computing system 912 can include a variety of computer system readable media. Such media may be any available media that is accessible by computing system 912, and it includes both volatile and non-volatile media, removable and non-removable media.

System memory 923 can include computer system readable media in the form of volatile memory, such as random access memory (RAM) 930 and/or cache memory 932. Computing system 912 can further include other removable/non-removable, volatile/non-volatile computer system storage media. By way of example only, storage system 934 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media could be provided. In such instances, each can be connected to bus 918 by one or more data media interfaces. As described below, memory 923 can include at least one program product having a set (e.g., at least one) of program modules or code that are configured to carry out the functions of embodiments of the invention.

Program/utility 940, having a set (at least one) of program modules 942, can be stored in memory 932 by way of example, and not limitation, as well as an operating system, one or more application programs, other program modules, and program data. Each of the operating system, one or more application programs, other program modules, and program data or some combination thereof, can include an implementation of a networking environment. Program modules 942 generally carry out the functions and/or methodologies of embodiments of the invention as described herein. Alternatively, a noisy labeled and unlabeled datapoint detection and rectification facility, module, logic, etc., 901 can be provided within computing environment 912, as disclosed herein.

Computing system 912 can also communicate with one or more external devices 914 such as a keyboard, a pointing device, a display 924, etc.; one or more devices that enable a user to interact with computing system 912; and/or any devices (e.g., network card, modem, etc.) that enable computing system 912 to communicate with one or more other computing devices. Such communication can occur via Input/Output (I/O) interfaces 922. Still yet, computing system 912 can communicate with one or more networks such as a local area network (LAN), a general wide area network (WAN), and/or a public network (e.g., the Internet) via network adapter 920. As depicted, network adapter 920 communicates with the other components of computing system, 912, via bus 918. It should be understood that although not shown, other hardware and/or software components could be used in conjunction with computing system 912. Examples, include, but are not limited to: microcode, device drivers, redundant processing units, external disk drive arrays, RAID systems, tape drives, and data archival storage systems, etc.

One or more aspects may relate to or use cloud computing.

It is understood in advance that although this disclosure includes a detailed description on cloud computing, implementation of certain teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

A cloud computing node can include a computer system/server, such as the one depicted in FIG. 9. Computer system/server 912 of FIG. 9 can be practiced in distributed cloud computing environments where tasks are performed by remote processing devices that are linked through a communications network. In a distributed cloud computing environment, program modules may be located in both local and remote computer system storage media including memory storage devices. Computer system/server 912 is capable of being implemented and/or performing any of the functionality set forth hereinabove.

Figure 10:
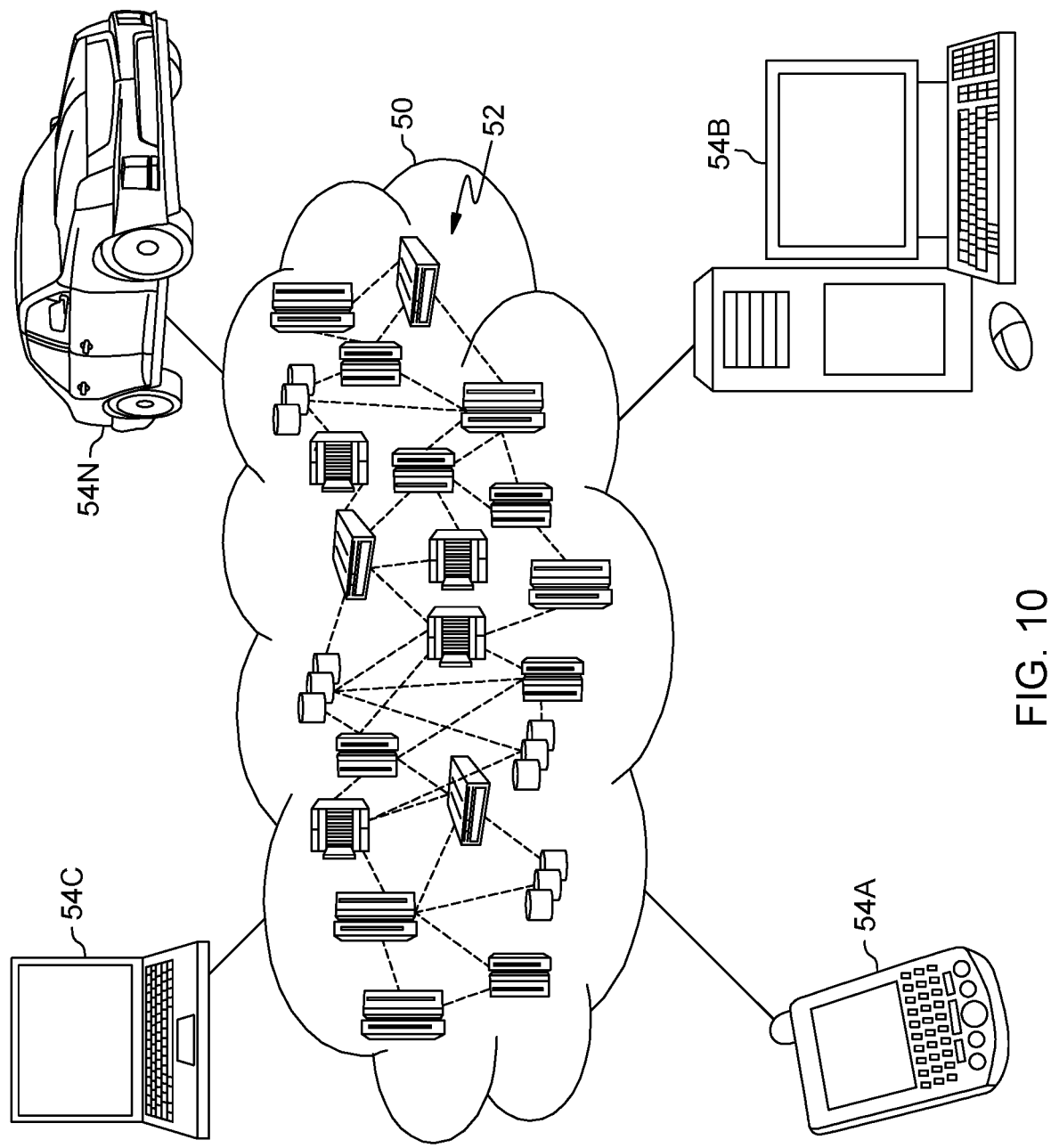
FIG. 10 depicts an embodiment of a cloud computing environment which can facilitate implementing, or be used in association with, certain aspects of an embodiment of the present invention.

Referring now to FIG. 10, illustrative cloud computing environment 50 is depicted. As shown, cloud computing environment 50 can comprise one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 11:
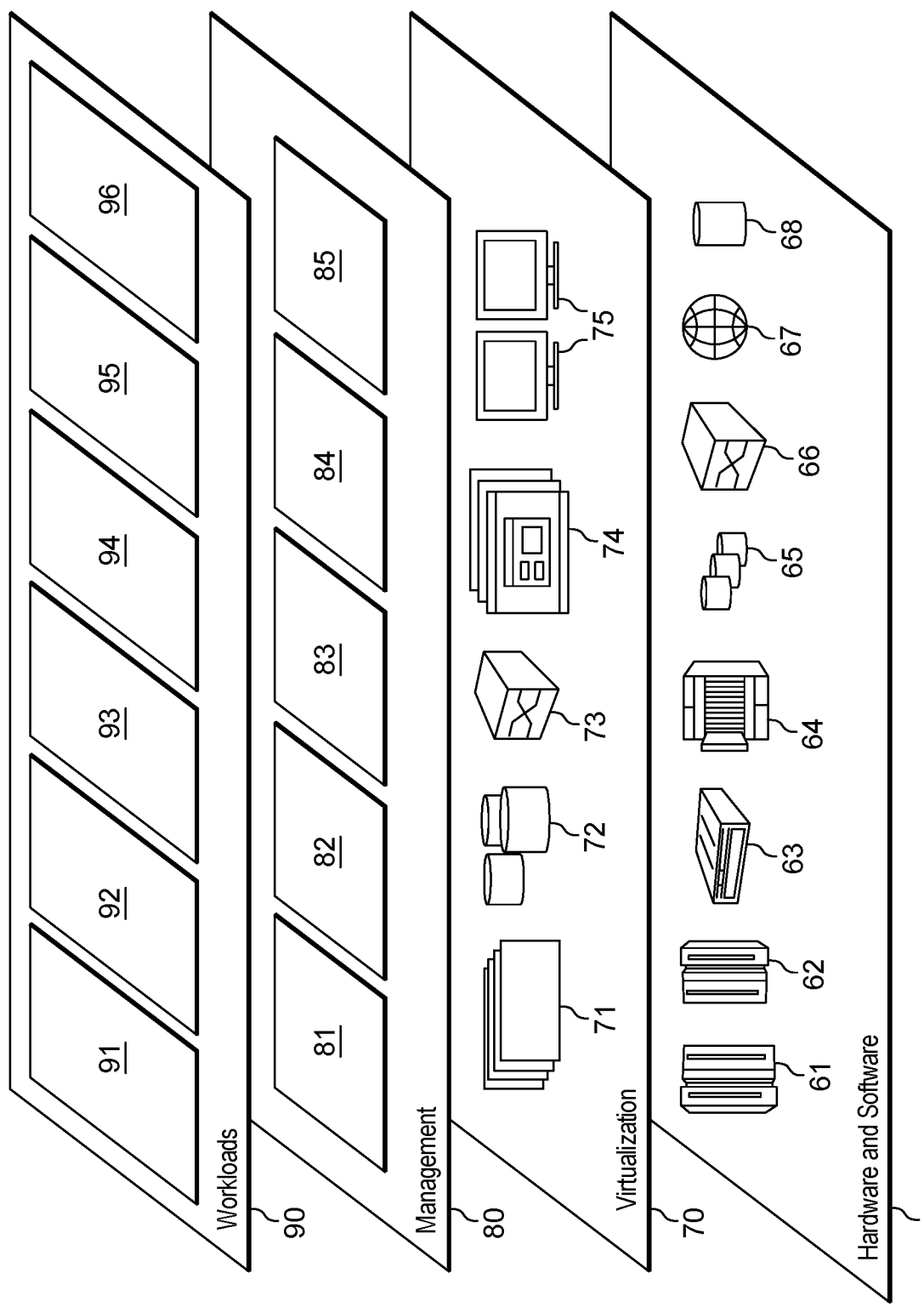
FIG. 11 depicts abstraction model layers according to an embodiment of the present invention.

Referring to FIG. 11, a set of functional abstraction layers provided by cloud computing environment 50 (FIG. 10) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 60 includes hardware and software components. Examples of hardware components include mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and noisy labeled and unlabeled datapoint detection and rectification for machine-learning processing 96.

The descriptions of the various embodiments of the present invention have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present invention may be a system, a method, and/or a computer program product at any possible technical detail level of integration. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer-implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, computing environments of other architectures can be used to incorporate and use one or more embodiments. Further, different instructions, instruction formats, instruction fields and/or instruction values may be used. Many variations are possible.

Further, other types of computing environments can benefit and be used. As an example, a data processing system suitable for storing and/or executing program code is usable that includes at least two processors coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form contain, such as "contains" and "containing") are open-ended linking verbs. As a result, a method or device that "comprises", "has", "includes" or "contains" one or more steps or elements possesses those one or more steps or elements, but is not limited to possessing only those one or more steps or elements. Likewise, a step of a method or an element of a device that "comprises", "has", "includes" or "contains" one or more features possesses those one or more features, but is not limited to possessing only those one or more features. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of one or more aspects of the invention and the practical application, and to enable others of ordinary skill in the art to understand one or more aspects of the invention for various embodiments with various modifications as are suited to the particular use contemplated.

What is claimed is:

1. A computer-implemented method comprising:
    training a machine-learning model using a training dataset including both noisy labeled datapoints and unlabeled datapoints, the training comprising:
        detecting, by one or more processors, noise in the training dataset, the detecting applying ensemble machine-learning and a generative model to the training dataset to detect noisy labeled datapoints in the training dataset, and to also create a clean dataset with preliminary labels added for the unlabeled datapoints in the training dataset;
        generating a datapoint pool including the detected noisy labeled datapoints and the unlabeled datapoints of the training dataset; and
        data-driven rectifying of one or more selected datapoints of the generated datapoint pool including the detected noisy labeled datapoints and the unlabeled datapoints of the training dataset, the data-driven rectifying including using, by the one or more processors, meta-data-driven active learning and the clean dataset to facilitate generating an active-learned dataset with true labels added for the one or more selected datapoints of the datapoint pool including the detected noisy labeled datapoints and the unlabeled datapoints of the training dataset; and
    wherein training the machine-learning model further includes using, at least in part, the generated active-learned dataset in training the machine-learning model.

2. The computer-implemented method of claim 1, wherein the detecting noise comprises applying ensemble machine-learning to the training dataset to build a set of base learners to produce ensemble predictions for datapoint labels in the training dataset, and using by the generative model the ensemble predictions in detecting, by the one or more processors, the noisy labeled datapoints in the training dataset.

3. The computer-implemented method of claim 2, wherein the training further comprises machine-learning, by the one or more processors, the generative model to estimate accuracy of the ensemble predictions for the datapoint labels in the training dataset, including the detected noisy labeled datapoints.

4. The computer-implemented method of claim 1, wherein the training further comprises using, by the one or more processors, the generative model to generate a vector of probabilistic labels which denote the generative model's confidence in datapoint labels in the training dataset, and based thereon, creating, by the one or more processors, the clean dataset and a noisy dataset for use by the one or more processors in the data-driven active learning, along with the vector of probabilistic labels produced by the generative model.

5. The computer-implemented method of claim 4, wherein using, by the one or more processors, data-driven active learning includes training, by the one or more processors, a regression model to estimate a reduction in a generalization error associated with labeling of datapoints in the datapoint pool of noisy labeled datapoints and unlabeled datapoints, and selecting one or more datapoints of the datapoint pool with a highest reduction in generalization error for user label rectification.

6. The computer-implemented method of claim 5, wherein training the regression model includes using, by the one or more processors, the clean dataset to create sets of labeled datapoints to train and test the regression model, and applying the regression model as a query strategy to rank datapoints in the datapoint pool of noisy labeled datapoints and unlabeled datapoints to facilitate selecting the one or more datapoints from the datapoint pool expected to result in the highest reduction in generalization error for the user label rectification.

7. The computer-implemented method of claim 6, further comprising creating a completely labeled dataset by combining the clean dataset and the actively-learned dataset containing the one or more selected datapoints receiving true labels from the user.

8. The computer-implemented method of claim 1, further comprising combining, by the one or more processors, the active-learned dataset and the clean dataset to provide a completely label clean dataset, and the training comprises using, by the one or more processors, the completely label clean dataset in training the machine-learning model.

9. A system of training a machine-learning model, the system comprising:
   a memory;
   one or more processors in communication with the memory; and
   program code executable by the one or more processors via the memory to perform a method comprising:
      training a machine-learning model using a training dataset including both noisy labeled datapoints and unlabeled datapoints, the training comprising:
         detecting, by one or more processors, noise in the training dataset, the detecting applying ensemble machine-learning and a generative model to the training dataset to detect noisy labeled datapoints in the training dataset, and to also create a clean dataset with preliminary labels added for the unlabeled datapoints in the training dataset;
         generating a datapoint pool including the detected noisy labeled datapoints and the unlabeled datapoints of the training dataset; and
         data-driven rectifying of one or more selected datapoints of the generated datapoint pool including the detected noisy labeled datapoints and the unlabeled datapoints of the training dataset, the data-driven rectifying including using, by the one or more processors, meta-data-driven active learning and the clean dataset to facilitate generating an active-learned dataset with true labels added for the one or more selected datapoints of the datapoint pool including the detected noisy labeled datapoints and the unlabeled datapoints of the training dataset; and
      wherein training the machine-learning model further includes using, at least in part, the generated active-learned dataset in training the machine-learning model.

10. The system of claim 9, wherein the detecting noise comprises applying ensemble machine-learning to the training dataset to build a set of base learners to produce ensemble predictions for datapoint labels in the training dataset, and using by the generative model the ensemble predictions in detecting, by the one or more processors, the noisy labeled datapoints in the training dataset.

11. The system of claim 10, wherein the training further comprises machine-learning, by the one or more processors, the generative model to estimate accuracy of the ensemble predictions for the datapoint labels in the training dataset, including the detected noisy labeled datapoints.

12. The system of claim 9, wherein the training further comprises using, by the one or more processors, the generative model to generate a vector of probabilistic labels which denote the generative model's confidence in datapoint labels in the training dataset, and based thereon, creating, by the one or more processors, the clean dataset and a noisy dataset for use by the one or more processors in the data-driven active learning, along with the vector of probabilistic labels produced by the generative model.

13. The system of claim 12, wherein using, by the one or more processors, data-driven active learning includes training, by the one or more processors, a regression model to estimate a reduction in a generalization error associated with labeling of datapoints in the datapoint pool of noisy labeled datapoints and unlabeled datapoints, and selecting one or more datapoints of the datapoint pool with a highest reduction in generalization error for user label rectification.

14. The system of claim 13, wherein training the regression model includes using, by the one or more processors, the clean dataset to create sets of labeled datapoints to train and test the regression model, and applying the regression model as a query strategy to rank datapoints in the datapoint pool of noisy labeled datapoints and unlabeled datapoints to facilitate selecting the one or more datapoints from the datapoint pool expected to result in the highest reduction in generalization error for the user label rectification.

15. A computer program product comprising:
   a computer-readable storage medium having computer-readable code embodied therein, the computer-readable code being executable by one or more processors to cause the one or more processor to:
      train a machine-learning model using a training dataset including both noisy labeled datapoints and unlabeled datapoints, the training comprising:
         detecting, by one or more processors, noise in the training dataset, the detecting applying ensemble machine-learning and a generative model to the training dataset to detect noisy labeled datapoints in the training dataset, and to also create a clean dataset with preliminary labels added for the unlabeled datapoints in the training dataset;
         generating a datapoint pool including the detected noisy labeled datapoints and the unlabeled datapoints of the training dataset; and
         data-driven rectifying of one or more selected datapoints of the generated datapoint pool including the detected noisy labeled datapoints and the unlabeled datapoints of the training dataset, the data-driven rectifying including using, by the one or more processors, meta-data-driven active learning and the clean dataset to facilitate generating an active-learned dataset with true labels added for the one or more selected datapoints of the datapoint pool including the detected noisy labeled datapoints and the unlabeled datapoints of the training dataset; and wherein training the machine-learning model further includes using, at least in part, the generated active-learned dataset in training the machine-learning model.

16. The computer program product of claim 15, wherein the computer-readable code is executable by the one or more processors to cause the one or more processors to apply ensemble machine-learning to the training dataset to build a set of base learners to produce ensemble predictions for datapoint labels in the training dataset, and use by the generative model the ensemble predictions in detecting the noisy labeled datapoints in the training dataset.

17. The computer program product of claim 15, wherein the computer-readable code is executable by the one or more processors to cause the one or more processors to use the generative model to generate a vector of probabilistic labels which denote the generative model's confidence in datapoint labels in the training dataset, and based thereon, create the preliminary clean dataset and a noisy dataset for use by the data-driven active learning, along with the vector of probabilistic labels produced by the generative model.

18. The computer program product of claim 17, wherein the data-driven active learning includes training a regression model to estimate a reduction in a generalization error associated with labeling of datapoints in the datapoint pool of noisy labeled datapoints and unlabeled datapoints, and selecting one or more datapoints of the datapoint pool with a highest reduction in generalization error for user label rectification.

* * * * *